Patented Nov. 22, 1949

2,489,145

UNITED STATES PATENT OFFICE 2,489,145

SYNTHETIC RESIN COMPOSITIONS EMPLOYING CURING CATALYSTS

David J. Lieb and Laurence E. Clark, Jr., Bainbridge, N. Y., and Raymond J. Spahr, New Brunswick, N. J., assignors to The Borden Company, New York, N. Y., a corporation of New Jersey No Drawing. Application January 18, 1947, Serial No. 722,958

1 Claim. (Cl. 260—71)

This invention relates to incompletely-reacted acid-curing synthetic resin compositions. In particular, the invention relates to compositions comprising acid-curing synthetic resins combined with a direct curing catalyst and to methods for curing such resins with a direct catalyst.

Many attempts have been made to provide catalysts for acid-curing synthetic resins which will accelerate the cure of such resins. Such catalysts are of two general types, direct catalysts and the indirect or latent catalysts. Direct catalysts are those which advance polymerization of the resin when they come in contact with the resin as, for example, organic and inorganic acids, acid salts and the like. Hydrochloric acid, sulfuric acid, sodium bisulfate and the like when used as direct catalysts are in general found to be unsatisfactory because, in the case of adhesives, they produce too high a resultant acidity in the glue line (i. e., too low a pH), in order to obtain a satisfactory rate of cure of the resin. This is undesirable for many reasons.

Moreover, when such inorganic acid catalysts are used in large quantities to produce high acidities in contact with resins of the class described, as for example, with resin adhesives, they act too rapidly with the result that the blue line between the bonded material becomes weakened. Furthermore, when inorganic acids are used as catalysts with resin adhesives for bonding plywood, employing the separate application method (i. e., applying the catalyst to one surface of the plywood, the resin to an opposite surface and then pressing the two surfaces together), they have been found to damage and weaken the wood surfaces to which they are applied.

Organic acids, such as oxalic acid, may be used to set up the resins of the class described, but they must be used in large amounts to produce sufficient acidity and moreover the resulting products are not generally durable and ordinarily have poor water resistance.

It was, therefore, a general object of this invention to provide a direct catalyst for acid-curing synthetic resins whereby the aforementioned disadvantages were overcome.

A further object of the invention was to provide a direct curing catalyst which would result in the production of a durable final product when used with acid-curing synthetic resins but which at the same time would not produce undesirable effects which ordinarily result when strong mineral acids or acid salts are employed as direct catalysts.

Another object was to provide a direct curing catalyst for acid-curing synthetic resins which would bring about a rapid cure of the resin at relatively low temperatures.

A still further object was to provide a direct curing catalyst for acid-curing synthetic resins wherein the rate of cure of the resin is faster at a higher resultant pH, i. e., lower acidity, than is realized when the ordinary organic or inorganic acids or acid salts are employed.

Another object of the invention was to provide a catalyst for acid-curing resins which would not have an appreciable destructive action when applied to wood or other cellulosic materials.

A still further object of the invention was to provide a catalyst for acid-curing synthetic resins which would not immediately precipitate the resin from solution, and which would at the same time promote rapid cure of the resin.

Another object of the invention was to provide an acid catalyst for acid-curing synthetic resins which became exothermic upon being brought into contact with the resin.

Other objects of the invention will in part be obvious and will in part appear hereinafter.

Accordingly, we have now found an organoboron trihalide complex to be a desirable direct acid catalyst for acid-curing synthetic resins. which catalyst substantially fulfills all of the prerequisites of the ideal direct catalyst, and which will promote rapid cure of the resin without the disadvantages which are usually attendant upon the use of ordinary organic acids, inorganic acids or acid salts. In the now preferred embodiment of the invention, the organo-boron trihalide complex is added to or combined with the resin at the last possible moment prior to application of pressure. The complex catalyst may be advantageously employed in the laminating art by the separate application method which comprises applying the catalyst to one sheet of the material to be laminated and applying the acid-curing synthetic resin to another sheet of such material, then pressing the individual sheets together so that the catalyst and the resin come into contact with each other, whereby the catalyst causes the resin to polymerize and harden to form a strong bond.

The invention accordingly comprises the several steps of forming a synthetic resin product, and the relation of one or more of such steps with respect to each of the others; and the article possessing the features, properties, and relation of elements which are exemplified in the following detailed disclosure and the scope of the invention will be indicated in the claims.

For purposes of illustration, reference will be made to a process for gluing plywood, but it is to be understood that the catalyst of the invention may be employed with acid-curing synthetic resins in various other processes apparent to those skilled in the art. In practicing the separate application method of gluing it is customary to apply a catalyst to one surface of a material to be glued while applying an acid-curing synthetic resin to an opposite surface, then pressing the two surfaces together. The catalyst accelerates the cure of the synthetic resin causing it to harden and form a strong bond between the two materials. If desired, with some resins, the assembly may be heated during the pressing operation to speed up the rate of cure.

The rate of conversion of the acid-curing synthetic resin into the hard, insoluble state depends to a great extent upon the pH of the resin-catalyst mass. The optimum pH range for promoting such reaction at room temperature is approximately 1.0–4.0. However, when strong acids are used, such as inorganic mineral acids, in order to provide a satisfactory rate of cure the pH of the resin mix must be in the range of about 0.1–1.5. Resins cured in this range have been found to have poor resistance to exposure to atmospheric conditions such as high humidity, moisture, elevated temperatures, and the like. Moreover, such high acidity, when resin mixtures are used having a pH within a range of 0.1–1.5, has a highly destructive action on other materials as, for example, when a resin glue having such acidity is used as a bonding agent for plywood. Such acids have a destructive action on the wood fibres adjacent the glue line, and wood bonded under such conditions undergoes a ply separation at such point when subjected to laboratory tests as well as field tests under service conditions.

For example, in making a construction by edge gluing core stock using a urea resin glue and sodium bisulfate following the separate application method, a solution of sodium bisulfate is applied to one of the surfaces which is then pressed to another surface which has been coated with the urea resin adhesive. The extremely acid nature of the catalyst makes it possible to ease the pressure after about 30 minutes to form a bond. Such bonds, however, are not very durable.

It has now been found that such problems and difficulties may be overcome by employing as the catalyst an organo-boron trihalide complex with such acid-curing synthetic resins to produce a pH of approximately 1.5–2.5, and which will even become less acid after pressing and upon aging.

The organo-boron trihalide catalyst of the present invention may be employed as a curing catalyst for acid-curing synthetic resins as a class. Many of such resins usually require heat to effect a rapid cure, and these are therefore often characterized as "thermosetting resins," in addition to being "acid-curing." For purposes of illustration, the catalyst of the class described may be employed to catalyze the amino-aldehyde resins, preferably at elevated temperatures, formed by condensing aldehydes, such as formaldehyde, acetaldehyde, propionaldehyde, crotonaldehyde, benzaldehyde, furfural and the like; with amines or amides, such as urea, thiourea, guanidine, methyl urea, acetyl urea, cyanamide, dicyanodiamide, biuret, semi-carbazide, aniline and derivatives of aniline. Examples of other acid-curing resins include triazine-aldehyde resins, e. g., the melamine resins, monophenyl melamine resins, diphenyl melamine resins, triphenyl melamine resins, ammeline resins, thioameline resins, ammelide resins, formoguanamine resins, acetoquanamine resins, lauroguanamine resins, stearoguanamine resins; or mixtures of combinations thereof such, for example, as urea-melamine-formaldehyde resins.

In preparing the acid-curing resins for use there may be incorporated therewith prior to, during, or after manufacture such substances as extenders, fillers, pigments, dyestuffs, plasticizers, and the like.

Boron trihalide compounds form complexes with various organic compounds when permitted to come into contact with such compounds at ordinary room temperatures, or temperatures slightly below or above room temperatures. For example, O'Leary and Wenzke reported on the complex formed when boron trifluoride gas is passed into methyl alcohol in an article published in the Journal of the American Chemical Society, vol. 55, No. 5, page 2117 (1933).

In general, organo-boron trihalide complexes may be prepared by contacting boron trihalide with an organic compound in liquid form until the boron trihalide has sufficiently combined with the organic compound to provide the acidity desired. This may range from a low concentration of the boron trihalide in the organic compound up to complete saturation.

The catalyst which is utilized in the present invention may be expressed by the following general formula:

$$R(OH)_y \cdot (BX_3)_z$$

where,

"R" is an aliphatic, aromatic, cyclic, or heterocyclic hydrocarbon radical such as an alkyl, alkenyl, cycloalkyl, cycloalkenyl, aryl, alkylaryl, alkenylaryl, arylalkyl, or arylalkenyl radical, unsubstituted; or in turn substituted with acyl groups or such other groups which have less tendency toward coordination with the boron trihalide than the —OH group;

"X" is an element of the halogen group, i. e., fluorine, chlorine, bromine, or iodine;

"y" is a whole number but never less than 1, and preferably never greater than 6; and "z" is a whole number numerically equal to or less than y, but never less than 1 nor more than y.

The organo-boron trihalide complex may be prepared by contacting the boron trihalide with such organic substances containing an —OH group, as methanol, ethanol, propanol, isopropanol, butanol, isobutanol, a glycol, glycerol, phenol, resorcinol, catechol, xylenol, cyclohexanol, m-cresol, benzyl alcohol, pyrogallol, aminophenol, glucose, sorbitol, mannitol, and the like.

Although the boron trihalide may be reacted with or absorbed by the organic substances of the class described, excellent results have been obtained by passing boron trihalide gases such as $BF_3$ or $BCl_3$ into the organic substance in liquid form by means of a tube having its outlet beneath the surface, and permitting the gas to bubble upwardly through such liquid until a desired concentration of the organo-complex is attained. The method of absorption of the gas by the organic compound to form the complex is determined by the physical properties of the organic compound. For example, where the organic compound is a liquid at room temperature such, for example, as methanol, ethanol, propanol, butanol, and the like, the gas is best absorbed by cooling the material while the gas is bubbled through the liquid. Where the organic compound is a solid at room temperature such, for example, as phenol, the initial absorption may be carried out by first heating such solid to slightly above the melting point and passing the gas into the melted compound. When sufficient gas has been absorbed to render the mixture liquid at room temperature, the temperature may then be lowered by cooling and the absorption continued to the point of saturation desired. Where the required absorption of the boron trifluoride gas is impractical or impossible at temperatures necessary to maintain the organic compound in liquid form or to preserve its stability, absorption may be carried out by dissolving the solid compound in a suitable carrier or solvent such, for example, as one or more of the liquid alcohols, and then passing the gas through the solution.

Other solvents which have been found suitable as carriers for the organic substance during reaction, or as a diluent or fume-reducing agent for the trihalide-complex after it has been formed, comprise diethylene glycol monoethyl ether, ethyl methyl ketone (2-butanone), cyclohexanol, (hexalin), octyl alcohol, n-butyl alcohol, benzol, xylol, and the like. It has been found that the amount of such solvent may be varied from 1 to 34 parts solvent per 1 part concentrated trihalide-complex by weight.

In a preferred embodiment, phenol has been found to be a desirable organic substance which may be subjected to the above-described treatment with a boron trihalide particularly, boron trifluoride, to form the complex catalyst. For example, boron trifluoride gas is passed into phenol, by first heating the phenol sufficiently to cause it to melt and form a liquid, thereafter passing the gas through the melted phenol, gradually cooling the phenol as more of the boron trifluoride gas becomes absorbed. After absorbing in the phenol such quantity of the boron trifluoride gas as desired, the organo complex thus formed is diluted with denatured ethanol. The diluted complex, in addition to providing satisfactory acidity, prevents the complex from fuming to an undesirable extent. A satisfactory composition has been found to comprise 1 part by weight of $BF_3$ to 2 parts by weight of phenol, thereafter diluting the $BF_3$-phenol complex with 3 parts by weight of ethanol.

The following examples are given by way of illustration and not by way of limiting the invention. Unless otherwise state, all parts given are by weight:

Example I 1 mol of urea was refluxed with 2 mols of 37% aqueous formaldehyde at a pH of about 5.5-6.0 to a point of relatively high viscosity, after which time the reaction was stopped and about 20% wood flour added to the condensate. The product was spray dried and later redissolved in water to form an adhesive. The liquid adhesive was then applied to a surface of fir plywood.

To the surface of another section of plywood to be joined to the above-treated wood, there was applied, in an amount equal to one-third the weight of the resin, a catalyst prepared by absorbing 141 g. of boron trifluoride in 94 g. of phenol by first heating the phenol to its melting point and passing the boron trifluoride gas therein, lowering the temperature of the liquid as the gas absorbed. The organo-boron trifluoride complex was diluted with an equal weight of ethyl alcohol. The two surfaces of wood were then brought together under a pressure of about 100 p. s. i. for a period of about 30 minutes at room temperature, although satisfactory results have been obtained by pressing for as little as 1 or 2 minutes. The pH of the glue line was about 2.0, and gradually rose to about 2.5 after a few days. A durable bond was formed between the sections which did not substantially deteriorate upon aging.

Example II

An adhesive was formed by condensing 1 mol of thiourea with 1.2 mols of formaldehyde by refluxing under mildly alkaline conditions. The product was stabilized with a small amount of ammonium hydroxide. The adhesive thus formed was applied to a wood surface. There was applied to the surface of another piece of wood an organo-boron trifluoride catalyst prepared as described in Example 1, and the two prepared surfaces were then brought together under pressure of about 100 p. s. i. for a period of about 30 minutes at room temperature. The reaction of the catalyst upon the resin produced an exothermic effect resulting in a slight rise in temperature, which in turn caused a proportionate acceleration in the curing of the resin. A strong bond was formed between the two surfaces.

Example III 1 mol of melamine and 3 mols of formaldehyde were condensed under mildly acid conditions and concentrated under reduced pressure to a medium viscosity. The condensate was applied to a prepared surface of wood intended to be joined. An organo-boron trifluoride complex catalyst prepared as described in Example I was applied to a second piece of wood. The two surfaces thus prepared were then brought together under pressure of about 80 p. s. i. at room temperature for a period of about 30-45 minutes, after which time the pressure was released. The materials thus joined were found to have excellent bond strength, and the glue line was particularly firm and durable.

Example IV

A liquid resin was prepared by condensing 1 mol of aniline with 2 mols of formaldehyde under strongly acid conditions. The liquid resin was applied to one wooden surface to be joined, and at the same time there was applied to another wooden surface an organo-boron trifluoride complex catalyst prepared as described in Example I. The two prepared surfaces were then brought together under pressure of about 75-100 p. s. i. and at room temperature for a period of about 25-30 minutes. A durable bond was formed between the two surfaces.

Example V

A liquid resin was prepared by condensing a mixture of 1 mol of urea with 2 mols of formaldehyde under mildly acid conditions. The condensate was dehydrated to a viscosity which was satisfactory for spreading purposes. The liquid resin was then applied to one wooden surface, and to another wooden surface there was applied an organo-boron trifluoride complex catalyst prepared as described in Example I. The two surfaces were then brought together under pressure of about 100 p. s. i. at room temperature for a period of about 15-30 minutes. A bond was formed between the two surfaces which was very durable and which had improved characteristics.

*Example VI*

A urea-formaldehyde adhesive was prepared by refluxing 1 mol of urea with 2 mols of formaldehyde at a pH of about 6.1 until a viscosity of about 100 centipoises (measured at room temperature) was reached, after which time the reaction was stopped. The liquid resin adhesive was then applied as a thin film to the surface of red gum lumber. To the surface of another piece of red gum lumber there was applied a thin film of catalyst formed by absorbing 1 mol of boron trifluoride gas in 1 mol of methanol to which there was then added 2 parts by weight of methanol. About 5 g. of catalyst were used for each 100 g. of resin glue. The assembly period was about 30 seconds and the two surfaces were pressed together at a pressure of about 100 p. s. i. for about 30 minutes at a temperature of about 75° F. Upon contact with resin glue, an exothermic action developed which carried the temperature to about 90° F. The pH of the glue line was about 2.65.

Four tests were made on a number of identical blocks prepared as set forth in Example VI and subjected to the Olsen Shear test. After intervals of several hours, the following results were tabulated:

| Maturing Period | Olsen Shear Test |
| --- | --- |
| None | 735-20 |
| 2 hours | 1,180-70 |
| 4 hours | 1,260-65 |
| 6 hours | 1,280-85 |
| 8 hours | 1,715-95 |
| 10 hours | 1,685-100 |

*Example VII*

A urea-formaldehyde resin adhesive was prepared by refluxing 1 mol of urea with 1.8 mols of 37% aqueous formaldehyde under mildly acidic conditions to a point of low viscosity. The reaction was stopped, and the adhesive was applied to one surface of a block. To another similar block, there was applied an organo-boron trifluoride complex catalyst prepared as described in Example I, in an amount equal to about one-fourth the weight of the resin adhesive employed.

A second set of test blocks of fir wood were similarly prepared. The blocks were placed together under pressure of about 150 p. s. i. at 70° F. The assembly time was 15 minutes. They were held under this pressure for about 1 minute, after which time they showed an immediate shear by the Olsen Shear test of 870-25 (20 minutes post-pressure), and a final shear of 840-25 (6 days maturing). The highest shear was 1565. The film pH was about 2.0, but gradually increased upon aging.

Similar tests were conducted on maple blocks, and the results were relatively comparable to those on fir.

*Example VIII*

A formaldehyde-urea resin condensate was prepared, containing approximately 72% formaldehyde and 28% urea, by refluxing urea and formaldehyde under mildly acid conditions.

An organo-complex catalyst was also prepared by absorbing 53.2 parts of boron trichloride in 100 parts of methanol by passing the boron trichloride into the methanol on an ice bath. The organo-boron trichloride complex thus formed was then diluted with an equal part by weight of denatured ethyl alcohol.

The complex catalyst was applied to a surface of fir wood, and the synthetic resin was applied to a second piece of fir wood. The two surfaces were then pressed together. The assembly time was about 5 minutes. The two pieces of wood were joined under pressure of about 100 p s. i. for a period of about 35 minutes. A durable bond was formed between the two surfaces.

*Example IX*

23.5 g. of boron trichloride were absorbed in 100 parts of 5° M. P. cresol. The organo-complex catalyst thus formed was diluted with an equal part by weight of methanol.

The complex catalyst was applied to a surface of wood to be joined, and to a second piece of wood there was applied a formaldehyde-urea liquid resin prepared as described in Example VIII. The two surfaces were pressed together under pressure of about 50 p. s. i. for a period of about 35 minutes. A strong bond was formed between the two wood surfaces which did not appreciably deteriorate upon aging.

*Example X*

A melamine-formaldehyde condensate was prepared by reacting 1 mol of melamine with 2 mols of formaldehyde under mildly acid conditions, followed by concentration under reduced pressure. The resin was mixed with a cellulose filler and poured into a mold, while at the same time there was added to the resin an organo-boron trifluoride complex catalyst formed according to the procedure outlined in Example I in an amount equal to about one-fifth the weight of the resin. The resin hardened to form a cast product. The gelling time was 2¼ hours at 70° F., and the resin became glass hard in 24 hours at 70° F.

The catalyst of the class described is fast-setting in its action without the disadvantage of precipitating the resin. The catalyst does not depend upon the necessity of having an amount of free formaldehyde present in the resin to be effective, such as ordinarily required when ammonium chloride or ammonium sulfate catalysts are employed.

The organo-trihalide complex catalyst may be used in combination with acid-curing resin condensates in various ways, such for example in the manufacture of plywood, the joining of wood surfaces, and in the lamination of paper, textiles or other sheet materials. Single sheets of material may also be impregnated with the catalyst and an acid-curing synthetic resin thereafter applied, whereupon the resin hardens to form a coated product which is resistant to moisture, insects and fungus. Other various uses may be made of the catalyst in combination with synthetic resins of the class described, with or without fillers, extenders, coloring matter, or other additive substances.

Since certain changes in carrying out the above process and certain modifications in the composition which embody the invention may be made without departing from its scope, it is intended that all matter contained in the above description shall be interpreted as illustrative and not in a limiting sense.

What is claimed is:

A hardenable urea-aldehyde condensate combined with a curing catalyst comprising an organo-boron trihalide complex formed by adding boron trifluoride to phenol.

DAVID J. LIEB.
LAURENCE E. CLARK, Jr.
RAYMOND J. SPAHR.

REFERENCES CITED

The following references are of record in the file of this patent:

UNITED STATES PATENTS

| Number | Name | Date |
|---|---|---|
| 1,150,642 | Stockhausen et al. | Aug. 17, 1915 |
| 2,456,628 | Dunlop et al. | Dec. 21, 1948 |